(12) United States Patent
Bieber

(10) Patent No.: US 7,258,035 B2
(45) Date of Patent: Aug. 21, 2007

(54) RACK AND PINION STEERING DEVICE

(75) Inventor: Juergen Bieber, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 737 days.

(21) Appl. No.: 10/489,145

(22) PCT Filed: Sep. 14, 2002

(86) PCT No.: PCT/EP02/10324

§ 371 (c)(1),
(2), (4) Date: Apr. 1, 2004

(87) PCT Pub. No.: WO03/029067

PCT Pub. Date: Apr. 10, 2003

(65) Prior Publication Data

US 2004/0216548 A1    Nov. 4, 2004

(30) Foreign Application Priority Data

Sep. 28, 2001 (DE) ............................ 101 48 262

(51) Int. Cl.
*F16H 35/00* (2006.01)
(52) U.S. Cl. .................. 74/388 PS; 74/422; 74/89.17; 180/78
(58) Field of Classification Search ........... 74/388 PS, 74/89.17, 422, 492, 493, 485; 180/78, 79
See application file for complete search history.

(56) References Cited

U.S. PATENT DOCUMENTS

| 4,187,736 | A | * | 2/1980 | Haegele ........................ 74/422 |
| 4,709,591 | A | * | 12/1987 | Emori et al. ................... 74/422 |
| 6,089,589 | A | * | 7/2000 | Miyazaki ..................... 280/428 |
| 6,467,567 | B2 | * | 10/2002 | Kobayashi et al. ......... 180/444 |

FOREIGN PATENT DOCUMENTS

| EP | 0 812 755 | 12/1997 |
| EP | 1122149 | 8/2001 |
| JP | 8-133102 | 5/1996 |

* cited by examiner

Primary Examiner—David M. Fenstermacher
(74) Attorney, Agent, or Firm—Jordan and Hamburg LLP

(57) ABSTRACT

The invention relates to a rack and pinion steering device having a rack (1) which is arranged in a housing (4) and is connected at both ends to the steerable wheels via track rods (6) and steering arms, and having a pinion (2) which engages continuously in the rack (1) and is connected to the manual steering wheel via a steering column, and having stop means (10; 11; 12) which are integrated at both ends between the housing (4) and axially movable parts of the rack and pinion steering device and limit the axial movement of the rack (1) in both steering directions, the stop means (10; 11; 12) comprising elastically compliant material (12) which is completely enclosed in nonelastic parts (10; 11) of the stop means (10; 11; 12) which can move axially with respect to one another.

7 Claims, 2 Drawing Sheets

RACK AND PINION STEERING DEVICE

BACKGROUND OF INVENTION

The invention relates to a rack and pinion steering device according to the precharacterizing clause of patent claim 1.

It is generally known in rack and pinion steering devices for the steering to be limited by the wheel support (steering knuckle) striking the suspension link or by the limiting means being moved into the steering mechanism. These steering limiting systems display disrupting impact noises.

Said impact noises are avoided in a rack and pinion steering device according to DE 34 29 597 A1, which has stop members which are fastened to the rack in order to limit the axial movement of the rack against the housing. A part of the contact faces is equipped with elastically compliant parts in such a way that contact is initially made with the elastically compliant parts, in order to absorb the impact jolt in this way, before the metal on metal contact occurs.

JP 08 133102 A has disclosed a stop system whose stop means, comprising elastic material, is completely enclosed in mutually axially movable, nonelastic parts of the stop system, faces of a support element of the steering device being partially used for the enclosure.

In particular in the case of electrically assisted steering devices in which the rotational output movement of an electric motor is used to assist the manual force exerted on the steering handle, the damping concepts of conventional stop systems are not sufficient, on account of the mass moment of inertia of the electric motor, to damp the impact noises between the pairs of stops, for example the track rod and steering mechanism housing.

SUMMARY OF THE INVENTION

The invention is based on the problem of designing a rack and pinion steering device of the type specified in the introduction, in which satisfactory displacement restriction is achieved, both for conventional steering systems and for power assisted or externally assisted steering systems, and disruptive contact noises are avoided in the process. The problem is solved by the features specified in the characterizing part of patent claim 1, in that the elastically compliant material which is integrated between the pairs of stops is completely enclosed by nonelastic parts of the stop means.

The advantages achieved by the invention consist, in particular, in sufficient limitation of the steering angle being made possible in a simple manner, without relatively great additional expenditure on material and working time, and the stop means itself being designed to be extremely simple and space saving. Advantageous developments of the invention are specified in the dependent claims.

One exemplary embodiment of the invention is explained in greater detail in the following text and is shown in the accompanying drawings.

DESCRIPTION OF THE PREFERRED EMBODIMENTS

Substantially identical parts in the different figures are provided with identical designations.

Figure 1:
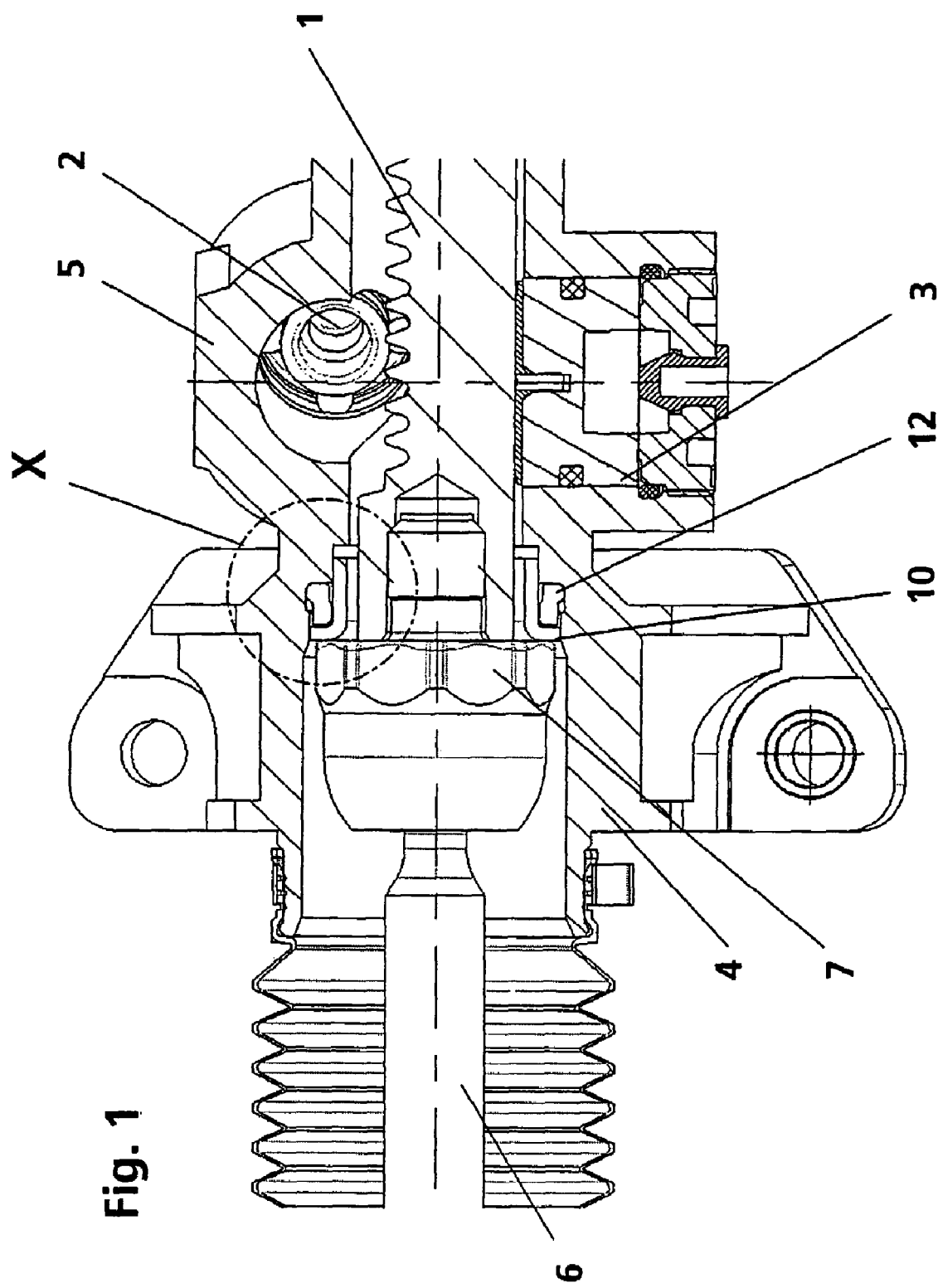
FIG. 1 shows a section through a steering mechanism.
Figure 1A:
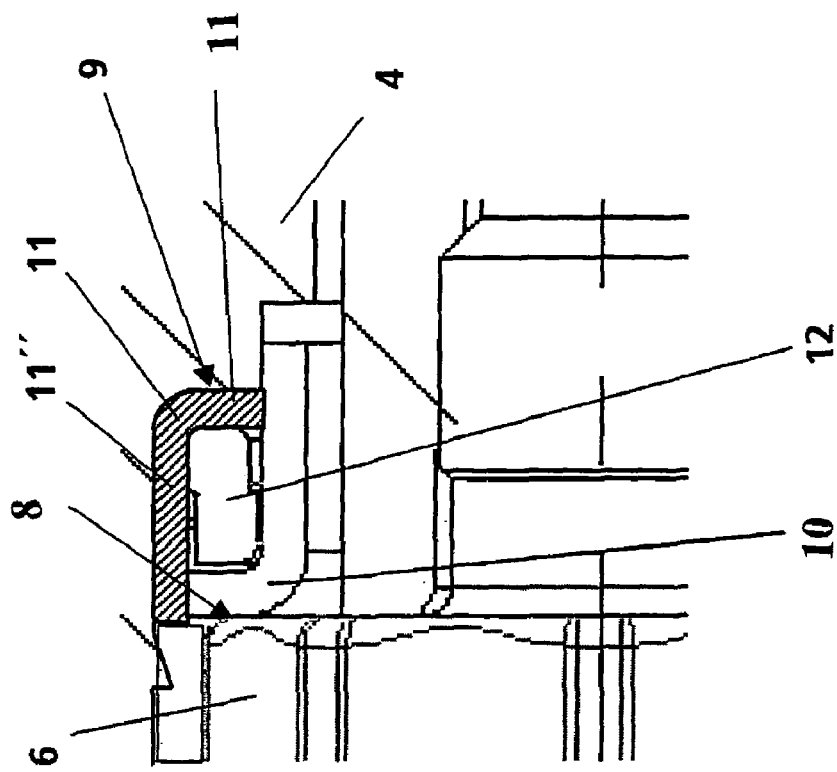
FIG. 1a shows a detail X.
Figure 1B:
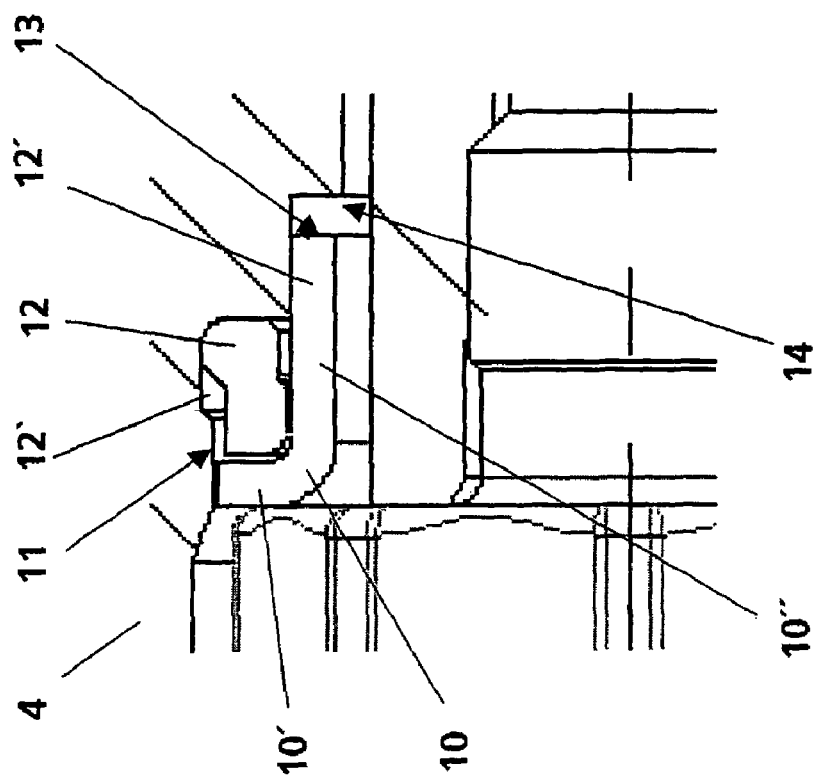
FIG. 1b shows a further variant of the detail X.

The drawing shows a detail of a rack and pinion steering device having a pair of stops 8; 9 and integrated stop means 10; 11; 12. An equivalent system is arranged on the other side of the rack 1 for the opposite steering angle. The rack 1 extends in an axially movable manner in a steering mechanism housing 4. A pinion 2 which is kept in constant engagement with the teeth of the rack 1 by a pressure piece 3 is mounted in an integrally formed attachment of the steering mechanism housing 4 serving as pinion housing 5. As the manual steering wheel (not shown) is connected to the pinion 2 via a steering column (not shown), the manually exerted steering force is transmitted to the rack 1 which, depending on the rotational direction of the pinion 2, transmits the steering movement to the steerable wheels (not shown) at both ends via the track rod 6 and the steering arm. The track rods 6 are in each case connected to the rack 1 via axial joints 7. Axial joint faces and housing faces 8 and 9 form a pair of stops 8; 9 at both rack ends. Stop means 10; 11; 12 are integrated between the stop faces 8 and 9 of each pair of stops 8; 9. A stop means 10; 11; 12 is formed from two flanges 10; 11 (FIG. 1b) of different diameters which are arranged at a distance from one another in such a way that their short webs 10' and 11' in each case rest on the mutually facing side of the opposite long webs 10" or 11" of the respective other flange 10 or 11, so that the flanges 10; 11 form an approximately hollow-cylindrical chamber which completely surrounds an elastically compliant material 12. While the outer flange 11 is permanently installed in the housing 4, the inner flange 10 can be moved axially to a limited extent. In another embodiment, the chamber faces of the outer flange 11 are advantageously formed by an angular recess 11 in the housing (FIG. 1a), so that the stop means 10; 11; 12 in itself can be designed to be even more space saving.

The flange 10 which is arranged so as to be axially movable with respect to the housing 4 maintains a distance, with its annular end face 13 facing away from the axial joint 7 in the relieved state, from the axially oriented face 14 of the housing 4. The faces 13; 14 which are arranged spaced apart and act as a mechanical end stop 13 and 14 protect the enclosed elastically compliant material 12 against overstressing as a result of misuse.

This elastically compliant material 12 has undercuts 12', by means of which the effect of the force introduced into this material 12 by a steering maneuver is influenced in a targeted manner and its deformation is directed in predetermined directions (no gap extrusion).

By way of example, the elastically compliant material 12 is connected directly to the housing 4 or with a form-fitting connection to the outer flange 11 by an elastic snap-action connection. The material 12 can also be fixed in position by an additional element, e.g. a securing ring, or by calking, vulcanizing or adhesive bonding. As a result of the permanent connection to the housing 4 or the flange 11, there are shear stresses on account of relative movements which additionally contribute to damping. Furthermore, the occurrence of gap extrusions in the elastic material 12 is avoided. It is likewise possible for the flange 10 to be connected to the elastically compliant material 12 using the same connecting elements or methods. By way of example, the flange 10 is connected to the material 12 by adhesive bonding. It is, however, also possible to insert the elastic material 12 in one or more pieces into the chamber surrounding it without a form-fitting or force-transmitting connection.

In the exemplary embodiment shown, the steering mechanism housing 4 is used as the support component 4 or 7 for the elastic stop means 10; 11; 12, so that the face 8 which corresponds to the stop means 10; 11; 12 is machined on the axial joint 7 of the track rod/rack connection. However, it is possible to integrate the elastic stop means 10; 11; 12 on the axial joint 7 or the rack 1 itself and to integrate the oppositely oriented end face 9 on the housing 4.

Beyond the illustration of a conventional steering system, it is also readily possible to use the elastic stop means 10; 11; 12 in power assisted steering systems, such as hydraulic, pneumatic, electrohydraulic and electric or externally assisted steering systems, such as steer-by-wire steering operating with a steering mechanism, that is to say the contact noises mentioned in the introduction and caused by the mass moment of inertia of an electric motor used for steering assistance are also eliminated.

The invention claimed is:

1. A rack and pinion steering device having a rack which is arranged in a housing and is connected at both ends to steerable wheels via track rods and steering arms, and having a pinion which engages continuously in the rack and is connected to the manual steering wheel via a steering column, and having stop means which are integrated at both ends between the housing and axially movable parts of the rack and pinion steering device and limit the axial movement of the rack in both steering directions, the stop means comprising elastically compliant material which is completely enclosed in nonelastic parts of the stop means which can move axially with respect to one another, and faces of a support component of the steering device are partially used in order to enclose the elastically compliant material, the elastically compliant material in each case at one end being embedded in a recess of the support component of the steering mechanism and at the other end is surrounded by a flange which can move axially to a limited extent.

2. The rack and pinion steering device as claimed in claim 1, wherein the stop means are integrated with the housing at both ends and correspond with the end face of the axial joint of the track rod.

3. The rack and pinion steering device as claimed in claim 1, wherein the stop means are arranged on the track rod side and strike against oppositely oriented end faces of the housing.

4. The rack and pinion steering device as claimed in one of claims 1, 2 or 3, whereby in the relieved state of the stop means the face of the flange facing away from the stop face maintains a distance from the face of the support component which corresponds with it.

5. The rack and pinion steering device as claimed in one of claims 1, 2 or 3, wherein the elastically compliant material has undercuts.

6. The rack and pinion steering device as claimed in one of claims 1, 2 or 3 wherein the stop means is adapted by additional elements and or displacement toward the support component or flange.

7. The rack and pinion steering device as claimed in one of claims 1, 2 or 3 wherein the flange is connected to the elastically compliant material with a force-transmitting or form-fitting connection.

\* \* \* \* \*